US012034355B2

(12) United States Patent
Gao et al.

(10) Patent No.: US 12,034,355 B2
(45) Date of Patent: Jul. 9, 2024

(54) VOICE COIL MOTOR DIRECT-DRIVE ACTIVE VIBRATION ISOLATION AND LEVELING INTEGRATED PLATFORM

(71) Applicant: GUANGDONG UNIVERSITY OF TECHNOLOGY, Guangzhou (CN)

(72) Inventors: Jian Gao, Guangzhou (CN); Junhao Yi, Guangzhou (CN); Lanyu Zhang, Guangzhou (CN); Haixiang Deng, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/430,711

(22) Filed: Feb. 2, 2024

(65) Prior Publication Data

US 2024/0171036 A1  May 23, 2024

Related U.S. Application Data

(63) Continuation of application No. PCT/CN2023/093919, filed on May 12, 2023.

(30) Foreign Application Priority Data

Jul. 5, 2022 (CN) .......................... 202210784045.7

(51) Int. Cl.
  *F16F 15/04* (2006.01)
  *F16F 15/02* (2006.01)
  (Continued)

(52) U.S. Cl.
  CPC ............. *H02K 5/24* (2013.01); *F16F 15/021* (2013.01); *H02K 11/21* (2016.01);
  (Continued)

(58) Field of Classification Search
  CPC .......... H02K 5/24; H02K 11/21; H02K 33/18; F16F 15/021; F16F 2228/063; F16F 2232/08
  (Continued)

(56) References Cited

U.S. PATENT DOCUMENTS

2017/0242243 A1  8/2017  Bullard
2019/0170208 A1* 6/2019  Liu .................... H02K 41/0356
  (Continued)

FOREIGN PATENT DOCUMENTS

CN  102943839 A  *  2/2013  .............. F16F 15/02
CN  102943839 A     2/2013
  (Continued)

OTHER PUBLICATIONS

Internation Search Report of PCT/CN2023/093919, Mailed Aug. 14, 2023.

*Primary Examiner* — Christopher P Schwartz

(57) ABSTRACT

A voice coil motor direct-driven active vibration isolation and leveling integrated platform. The voice coil motor direct-drive active vibration isolation and leveling integrated platform includes a moving platform, a base, a driving mechanism and a vibration isolation and leveling composite mechanism; the moving platform is rotatably disposed on the base around the X-axis and the Y-axis through the vibration isolation and leveling composite mechanism; the driving mechanism is used to drive the moving platform to perform leveling movement, and the force exerted by the driving mechanism on the moving platform is distributed symmetrically around the circumference of the moving platform.

7 Claims, 5 Drawing Sheets

(51) Int. Cl.
*H02K 5/24* (2006.01)
*H02K 11/21* (2016.01)
*H02K 33/18* (2006.01)

(52) U.S. Cl.
CPC ..... *F16F 2228/063* (2013.01); *F16F 2232/08* (2013.01); *H02K 33/18* (2013.01)

(58) Field of Classification Search
USPC ................. 188/378–380; 248/550, 562, 566; 267/136
See application file for complete search history.

(56) References Cited

U.S. PATENT DOCUMENTS

2019/0296627 A1 9/2019 Takahashi et al.
2021/0080348 A1* 3/2021 Moutafis ................ G01B 11/02

FOREIGN PATENT DOCUMENTS

| | | | | |
|---|---|---|---|---|
| CN | 106402233 | A | 2/2017 | |
| CN | 107393599 | A | 11/2017 | |
| CN | 107538231 | A | 1/2018 | |
| CN | 108278309 | A | 7/2018 | |
| CN | 107538231 | B * | 6/2020 | ............... B23Q 1/44 |
| CN | 212078864 | U | 12/2020 | |
| CN | 113719575 | A | 11/2021 | |
| CN | 215000266 | U | 12/2021 | |
| CN | 114153047 | A | 3/2022 | |
| KR | 20080097288 | A | 11/2008 | |
| WO | WO-2019019718 | A1 * | 1/2019 | ............... G01B 7/30 |

* cited by examiner

VOICE COIL MOTOR DIRECT-DRIVE ACTIVE VIBRATION ISOLATION AND LEVELING INTEGRATED PLATFORM

CROSS-REFERENCE TO RELATED APPLICATIONS

This application is a continuation of International Patent Application No. PCT/CN2023/093919 with a filing date of May 12, 2023, designating the United States, now pending, and further claims priority to Chinese Patent Application No. 202210784045. 7 with a filing date of Jul. 5, 2022. The content of the aforementioned applications, including any intervening amendments thereto, are incorporated herein by reference.

TECHNICAL FIELD

The invention relates to the field of precision manufacturing technology, and in particular to a voice coil motor direct-driven active vibration isolation and leveling integrated platform.

BACKGROUND OF THE PRESENT INVENTION

In fields such as precision measurement and precision machining, on the one hand, equipment and instruments are very sensitive to external vibration interference, and high-performance vibration isolation platforms or devices need to be used to isolate vibration interference and maintain the stability of the workpiece table; On the other hand, there are strict requirements on the spatial posture of the target workpiece, which often requires the workpiece table to be kept horizontal when the equipment is working, or the deflection angle can be accurately adjusted according to requirements. The traditional series leveling mechanism has large motion inertia, small output force, and accumulated errors, making it difficult to meet high-precision leveling and posture maintenance; the traditional parallel leveling mechanism relies on complex kinematics and dynamics calculations and decoupling, which is inconvenient to use. In addition, the method of connecting vibration isolators in series on the leveling platform will affect the final leveling accuracy on the one hand, and cause the device to be bulky and heavy on the other hand, which limits the application of the device in space and weight-limited situations.
Contents of the Present Invention In view of the existing vibration isolation and leveling devices, which on the one hand are difficult to achieve both high-efficiency vibration isolation and high-precision leveling, and on the other hand have complex structures, large volumes and weights, a voice coil motor direct-drive active vibration isolation leveling device is proposed. The integrated platform aims to realize a compact integrated device that is easy to decouple, and has efficient vibration isolation and high-precision leveling.

To achieve this goal, the present invention adopts the following technical solutions:

The voice coil motor direct-drive active vibration isolation and leveling integrated platform includes a moving platform, a base, a driving mechanism and a vibration isolation and leveling composite mechanism;

The moving platform is rotatably arranged on the base around the X-axis and the Y-axis through the vibration isolation and leveling composite mechanism; the driving mechanism is used to drive the moving platform to perform leveling movements, so the force exerted by the driving mechanism on the moving platform is circumferentially symmetrically distributed on the moving platform, and each force is perpendicular to the moving platform; the vibration isolation and leveling composite mechanism is used to isolate the vibration of the moving platform in the Z-axis direction, and to constrain the leveling movement of the moving platform around the X-axis and the Y-axis.

To further explain, the vibration isolation and leveling composite mechanism includes a motion constraint component, which includes a flexible universal joint, a top elastic piece, a bottom elastic piece, a central housing and a central shaft;

The central housing is erected on the top surface of the base;

The top elastic piece can cover the top opening of the central housing in a convex and concave deformation manner;

The top of the central shaft passes through the base and enters the interior of the central housing. The flexible universal joint is swingably disposed on the top of the central shaft. The top of the flexible universal joint passes through the top elastic piece and connects to the moving platform. The middle part of the top elastic piece is connected to the top surface of the central axis;

The bottom elastic piece is disposed on the bottom of the base so as to be deformable upwardly and downwardly. The middle part of the bottom elastic piece is connected to the bottom of the central axis.

To further explain, the central axis is a three-layer stepped axis. And the top and bottom surfaces of the central shaft are both provided with threaded holes for connection with the elastic pieces; the inner hole of the flexible universal joint is tightly matched with the middle layer of the central shaft and leans against the outer shoulder, and the top screw is screwed into the side threaded hole for fastening. There is a gap between the inner layer of the central shaft and the flexible universal joint for the flexible universal joint to swing normally.

To further explain, the vibration isolation and leveling composite mechanism further includes a load unloading component, which includes a connection bracket, spring stoppers, a coil spring and a support plate;

The support plate is sleeved on the outside of the central housing;

The connection bracket is covered on the top surface of the top elastic piece and is threadedly connected to the central axis;

A plurality of spring stoppers are fixed on the bottom surface of the connection bracket, one end of the coil spring is sleeved in the limiting groove on the top surface of the support plate, and the other end of the coil spring is sleeved in the spring stopper.

To further explain, the load unloading component further includes a screw runner and a hollow screw;

The hollow screw is disposed between the central housing and the support plate, and the hollow screw is rotatably sleeved on the outer periphery of the central housing; the support plate is sleeved on the outer periphery of the hollow screw, and threadedly connected to the hollow screw;

The screw runner is arranged below the support plate and tightly fitted on the outer periphery of the hollow screw.

To further explain, a bearing is provided between the hollow screw and the central housing, and a bearing gasket is provided between the bearing and the top surface of the base.

To further explain, the vibration isolation and leveling composite mechanism further includes a negative stiffness component, which includes buckling beams, buckling beam supports and studs;

Multiple pairs of buckling beam supports are symmetrically fastened to the base around the center circumference of the base; The buckling beam is an elongated rectangular metal sheet. The buckling beam is installed in a buckling state on a pair of buckling beam supports. One end of the buckling beam is fixed on one of the pair of buckling beam supports. The other end of the buckling beam is fixed on the other pair of buckling beam supports;

The stud passes through the midpoint of the buckling beam and is threadedly connected to the connection bracket.

To further explain, the driving mechanism includes a plurality of voice coil motors, and the plurality of voice coil motors are distributed in a central annular array of the moving platform. The stator of each voice coil motor is connected to the base, and the mover of each voice coil motor is connected to the moving platform.

To further explain, the driving mechanism further includes a limiting plate, which is erected on the base and distributed on the outer periphery of the moving platform. And a gap is provided between the limiting plate and the outer periphery of the moving platform.

To further explain, the driving mechanism further includes a displacement sensor, which is arranged on the inner side of the limiting plate and used to detect the vertical displacement of the moving platform.

Compared with the prior art, embodiments of the present invention have the following beneficial effects:

The vibration isolation and leveling composite mechanism is used to isolate vibration in the Z-axis direction and constrain the leveling movement around the X-axis and the Y-axis, and ensure that the various motion axes are isolated from each other. In terms of vibration isolation, the Z-direction vibration transmitted from the base is isolated by the vibration isolation and leveling composite mechanism to minimize the interference of the base vibration on the moving platform; in terms of leveling, the leveling movement of the moving platform is constrained by the vibration isolation and leveling composite mechanism, and the control torque of the driving mechanism acting on the moving platform is used to achieve leveling control. The present invention is essentially an integrated mechanism with series structure and power parallel connection. Compared with the traditional parallel branch chain leveling structure, the solution of the present invention realizes the dynamic decoupling of the three degrees of freedom of motion of the moving platform, omits the complex transmission branch chain structure of the traditional platform, and has no parasitic motion phenomenon. On the one hand, dynamic decoupling ensures that the vibration isolation and leveling of the moving platform do not interfere with each other, provides conditions for realizing the coordinated work of vibration isolation and leveling of the moving platform, and is conducive to improving the vibration isolation and leveling performance of the platform; On the other hand, the direct-drive design can make the structure of the platform simpler and more compact, which is beneficial to improving the accuracy of the leveling movement.

Figure 1:
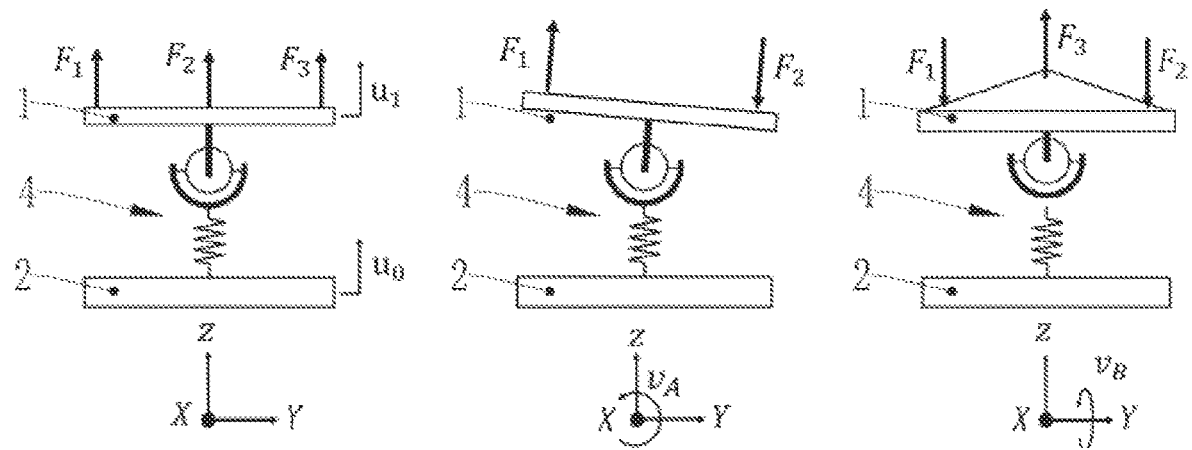
FIG. 1 is a schematic diagram of the basic principles of the vibration isolation and leveling of the voice coil motor direct-drive active vibration isolation and leveling integrated platform according to one embodiment of the present invention.

In the attached pictures: 1-moving platform, 2-base, 3-driving mechanism, 31-voice coil motor, 32-limiting plate, 33-displacement sensor, 4-vibration isolation and leveling composite mechanism, 41-motion constraint component, 411-flexible universal joint, 412-top elastic piece, 413-bottom elastic piece, 414-central housing, 415-central shaft, 416-top elastic piece pressure ring, 417-bottom elastic piece pressure ring, 418-round pressure piece, 42-load unloading component, 421-connection bracket, 422-spring stopper, 423-coil spring, 424-support plate, 425-screw runner, 426-hollow screw, 427-bearing, 428-bearing gasket, 43-negative stiffness components, 431-buckling beam, 432-buckling beam support, 433-stud, 434-buckling beam pressure plate.

DETAILED DESCRIPTION OF PREFERRED EMBODIMENTS

Embodiments of the present invention are described in detail below, examples of which are illustrated in the accompanying drawings, wherein the same or similar reference numerals throughout represent the same or similar elements or elements with the same or similar functions. The embodiments described below with reference to the drawings are exemplary and are only used to explain the present invention and cannot be understood as limiting the present invention.

In the description of the present invention, it should be understood that the orientations or positional relationships indicated by the terms "longitudinal", "transverse", "upper", "lower", "front", "rear", "left", "right", "vertical", "horizontal", "top", "bottom", "inner", "outer", etc. are based on the orientations or positional relationships shown in the drawings, and are only for the convenience of describing the present invention and simplifying the description. Any indication or implication that the referred device or element must have a specific orientation, be constructed and operate in a specific orientation should not be construed as a limitation on the invention. In addition, features defined by "first" and "second" may explicitly or implicitly include one or more of these features, which are used to distinguish and describe features without distinction of order or importance.

The following describes the voice coil motor direct-drive active vibration isolation and leveling integrated platform according to the embodiment of the present invention with reference to FIGS. 1 to 9, which includes a moving platform 1, a base 2, a driving mechanism 3 and a vibration isolation and leveling composite mechanism 4;

The moving platform 1 is rotatably arranged on the base 2 around the X-axis and the Y-axis through the vibration isolation and leveling composite mechanism 4; the driving mechanism 3 is used to drive the moving platform 1 to perform leveling movements, so the force exerted by the driving mechanism 3 on the moving platform 1 is circumferentially symmetrically distributed on the moving platform 1, and each force is perpendicular to the moving platform 1; The vibration isolation and leveling composite mechanism 4 is used to isolate the vibration of the moving platform 1 in the Z-axis direction, and to constrain the leveling movement of the moving platform 1 around the X-axis and the Y-axis.

In the embodiment of the present invention, the vibration isolation and leveling composite mechanism 4 is used to achieve vibration isolation in the Z-axis direction and constrain the leveling movement around the X-axis and Y-axis, and ensure that the various motion axes are isolated from each other. Specifically, coupling refers to the mutual influence among the multiple motion axes of the mechanism. The movement of one of the motion axes of the mechanism will involve the simultaneous movement of other motion axes, while decoupling refers to removing the interaction between the respective motion axes of the mechanism through structural design and optimization, so that each motion axis can move independently without affecting other motion axes, which is conducive to the implementation of subsequent control methods for the mechanism. In terms of vibration isolation, the Z-direction vibration transmitted from the base 2 is isolated by the vibration isolation and leveling composite mechanism 4 to minimize the interference of the vibration of the base 2 on the moving platform 1; in terms of leveling, the leveling movement of the moving platform 1 is constrained by the vibration isolation leveling composite mechanism 4, and the control torque of the driving mechanism 3 acting on the moving platform 1 is used to achieve leveling control. Specifically, as shown in FIG. 1, in some embodiments, under the action of the driving mechanism 3, three vertical forces in the direction of the moving platform 1 act on the moving platform 1 in parallel in a circumferentially symmetrical manner. By combining the three acting forces with different sizes and directions, driving forces or driving torques corresponding to the three degrees of freedom of movement of the moving platform 1 can be provided to achieve vibration reduction control in the Z-axis direction or leveling control in the X-axis and Y-axis directions. In addition, since the three degrees of freedom of movement of the moving platform 1 are orthogonal to each other and decoupled, the driving force and driving torque acting on the moving platform 1 comply with the superposition principle. By superimposing the driving forces corresponding to each movement direction of the platform, simultaneous control of multiple degrees of freedom of motion of the moving platform 1 can be achieved, which provides the possibility of coordinated and simultaneous control of vibration isolation and biaxial leveling of the moving platform 1.

The present invention is essentially an integrated mechanism with series structure and power parallel connection. Compared with the traditional parallel branch chain leveling structure, the solution of the present invention realizes the dynamic decoupling of the three degrees of freedom of motion of the moving platform 1, omits the complex transmission branch chain structure of the traditional platform, and has no parasitic motion phenomenon. On the one hand, dynamic decoupling ensures that the vibration isolation and leveling of the moving platform 1 do not interfere with each other, provides conditions for realizing the coordinated work of vibration isolation and leveling of the moving platform 1, and is conducive to improving the performance of the vibration isolation and leveling of the platform; on the other hand, the direct-drive design can make the structure of the platform simpler and more compact, which is beneficial to improving the accuracy of the leveling movement.

To further explain, the vibration isolation and leveling composite mechanism 4 includes a motion constraint component 41, which includes a flexible universal joint 411, a top elastic piece 412, a bottom elastic piece 413, a central housing 414 and a central shaft 415;

The central housing 414 is erected on the top surface of the base 2; specifically, the central housing 414 is columnar, and the bottom of the central housing 414 is fastened to the base 2 through bolts.

The top elastic piece 412 can cover the top opening of the central housing 414 in a convex and concave deformation manner; specifically, in one embodiment of the present invention, the motion restriction component 41 further includes a top elastic piece pressing ring 416, the top elastic piece pressure ring 416 presses the edge of the top elastic piece 412 against the top surface of the central housing 414, and the top elastic piece pressure ring 416 is connected to the central housing 414 through bolts.

Figure 4:
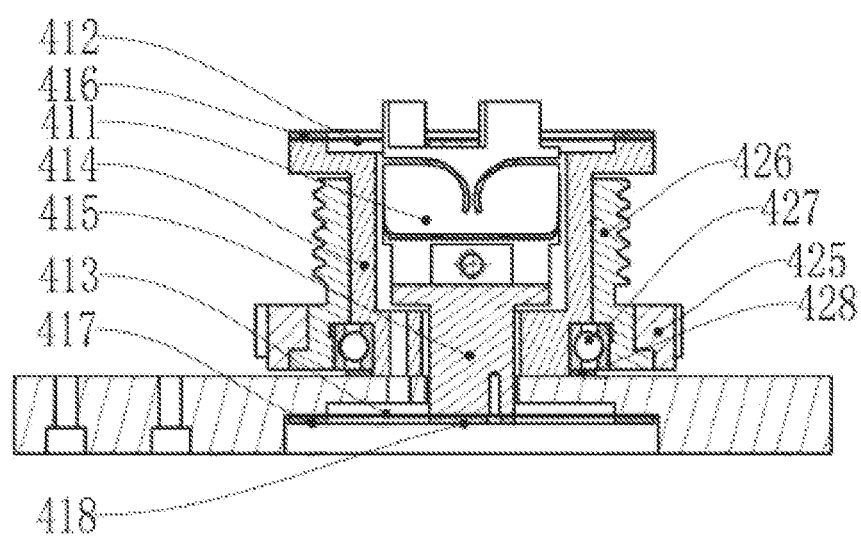
FIG. 4 is a cross-sectional view of the motion constraint component of the vibration isolation and leveling composite mechanism of the voice coil motor direct-drive active vibration isolation and leveling integrated platform according to one embodiment of the present invention.
Figure 5:
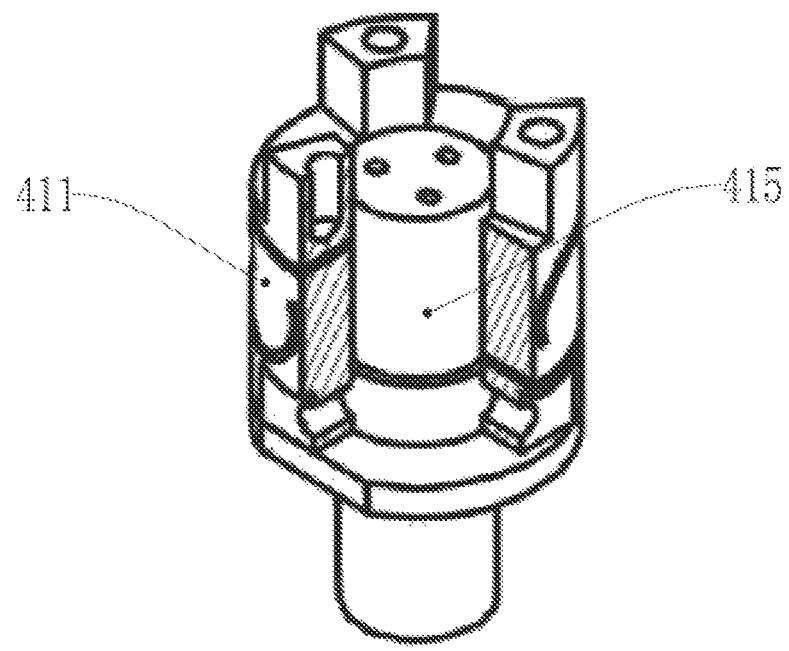
FIG. 5 is a schematic assembly diagram of the central axis and the flexible universal joint of the motion constraint component of the vibration isolation and leveling composite mechanism of the voice coil motor direct-drive active vibration isolation and leveling integrated platform according to one embodiment of the present invention.
Figure 6:
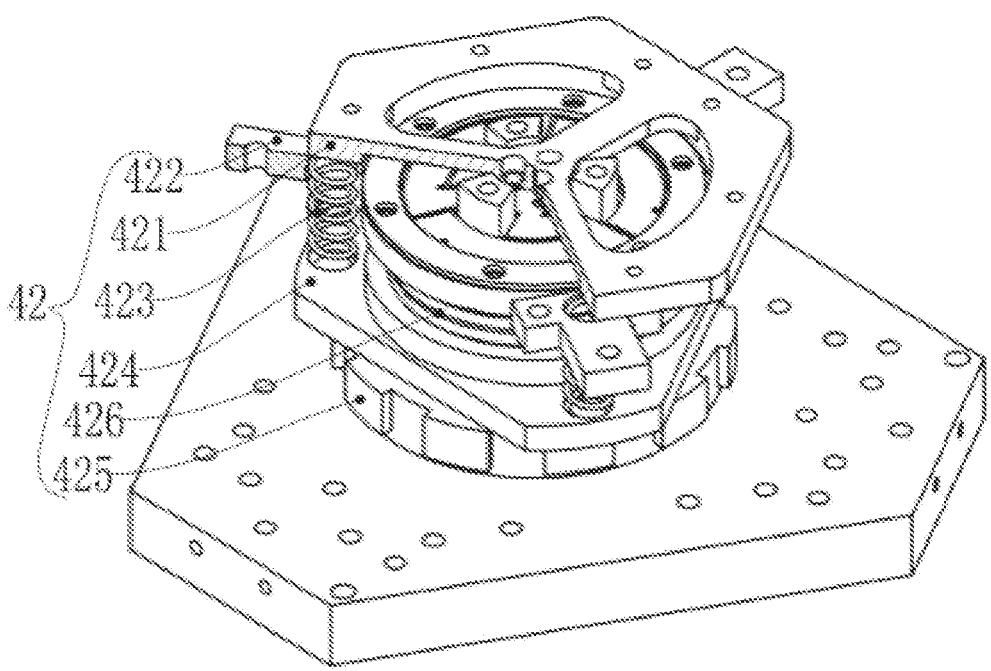
FIG. 6 is a schematic structural diagram of the load unloading component of the vibration isolation and leveling composite mechanism of the voice coil motor direct-drive active vibration isolation and leveling integrated platform according to one embodiment of the present invention.

The top of the central shaft 415 passes through the base 2 and enters the interior of the central housing 414. The flexible universal joint 411 is swingably disposed on the top of the central shaft 415. The top of the flexible universal joint 411 passes through the top elastic piece 412 and is connected to the moving platform 1, and the middle part of the top elastic piece 412 is connected to the top surface of the central shaft 415;

The bottom elastic piece 413 is disposed on the bottom of the base 2 so as to be deformable upwardly and downwardly. The middle part of the bottom elastic piece 413 is connected to the bottom of the central shaft 415. Specifically, in one embodiment of the present invention, as shown in FIG. 4, the motion restriction component 41 also includes a bottom elastic piece pressure ring 417 and a round pressure piece 418. And the bottom of the base 2 is provided with a stepped hole, so the bottom elastic piece pressure ring 417 presses the edge of the bottom elastic piece 413 against the stepped surface of the stepped hole. The bottom elastic piece pressure ring 417 is connected to the base 2 through bolts. Bolts are used to pass through the round pressure piece 418 and the bottom elastic piece 413 and then connect to the bottom of the central shaft 415.

Through the combination of the double elastic pieces and the central shaft 415, a flexible guide mechanism in the vertical direction is formed to constrain the horizontal movement of the platform. In addition, through the flexible universal joint 411 connected in series on the central shaft 415, the rotational motion of the platform around the central shaft 415 is constrained. Therefore, the motion constraint mechanism realizes motion constraints of three degrees of freedom in the horizontal direction and rotation direction of the moving platform 1.

Figure 9:
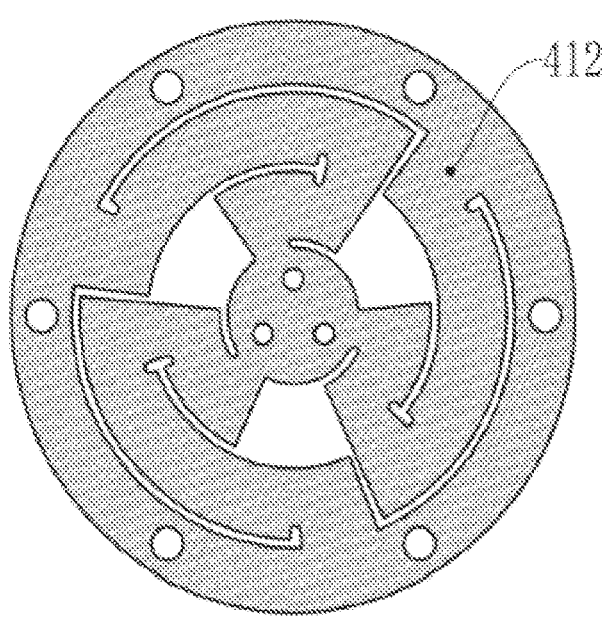
FIG. 9 is a schematic structural diagram of the top elastic piece of the motion constraint component of the vibration isolation and leveling composite mechanism of the voice coil motor direct-drive active vibration isolation and leveling integrated platform according to one embodiment of the present invention.

Preferably, the top elastic piece 412 and the bottom elastic piece 413 have the same shape and structure. The top elastic piece 412 and the bottom elastic piece 413 are obtained by carving patterns on the circular metal sheet using laser, electric spark, etc. By carving patterns on the circular metal sheet, a pattern is carved out, which makes the elastic piece exhibit the characteristics of low axial stiffness and high radial stiffness. As shown in FIG. 9, specifically, the pattern is a circumferentially symmetrical pattern, which facilitates the upward and downward deformation of the elastic piece.

Specifically, the central shaft 415 is a three-layer stepped shaft, and the top and bottom surfaces of the central shaft 415 are both provided with threaded holes for connecting with elastic pieces; the inner hole of the flexible universal joint 411 is tightly matched with the middle layer of the central shaft 415 and leans against the outer shoulder, and is screwed into the threaded hole on the side for fastening. There is a gap between the inner layer of the central shaft 415 and the flexible universal joint 411 for the flexible universal joint 411 to swing normally.

Compared with traditional rigid universal joints, the flexible universal joint 411 has a simple structure and high transmission accuracy, which is beneficial to reducing the size of the platform and improving the leveling accuracy of the platform.

To further explain, the vibration isolation and leveling composite mechanism 4 also includes a load unloading component 42, which includes a connection bracket 421, spring stoppers 422, a coil spring 423 and a support plate 424;

The support plate 424 is sleeved on the outside of the central housing 414;

The connection bracket 421 is covered on the top surface of the top elastic piece 412 and threadedly connected to the central shaft 415; specifically, bolts pass through the connection bracket 421 and the top elastic piece 412 from top to bottom and then connect to the threaded hole on the top surface of the central shaft 415. The connection bracket 421 and the elastic piece are fixed on the central shaft 415 to transmit the elastic force of the coil spring 423 to the central shaft 415 and take into account the compression of the inner ring of the elastic piece to achieve vertical motion restriction.

A plurality of spring stoppers 422 are fixed on the bottom surface of the connection bracket 421. One end of the coil spring 423 is sleeved in the limiting groove on the top surface of the support plate 424. The other end is inserted into the spring stopper 422 to prevent the spring from moving.

The load unloading component 42 is used to provide a supporting force to offset the gravity of the load. When the gravity of the load is transmitted to the central shaft 415 through the moving platform 1 and the flexible universal joint 411, the spring force is applied to the central shaft 415 through the connection bracket 421 to offset the effect of gravity.

To further explain, the load unloading component 42 also includes a screw runner 425 and a hollow screw 426;

The hollow screw 426 is disposed between the central housing 414 and the support plate 424. The hollow screw 426 is rotatably sleeved on the outer periphery of the central housing 414; the support plate 424 is sleeved on the outer periphery of the hollow screw 426 and threadedly connected to the hollow screw 426; specifically, the support plate 424 has internal threads that are threadedly matched with the hollow screw 426.

The screw runner 425 is disposed below the support plate 424 and tightly sleeved on the outer periphery of the hollow screw 426.

By rotating the hollow screw 426 through the screw runner 425, the support plate 424 is driven up and down, and the spring force can be adjusted to adapt to loads of different weights, and the height of the moving platform 1 can be fine-tuned.

To further explain, a bearing 427 is provided between the hollow screw 426 and the central housing 414, and a bearing gasket 428 is provided between the bearing 427 and the top surface of the base 2.

The hollow screw 426 is rotatably sleeved on the outer periphery of the central housing 414 through the bearing 427. The bearing 427 gasket is placed between the bearing 427 and the base 2 to prevent the bearing 427 from contacting the base 2.

Figure 7:
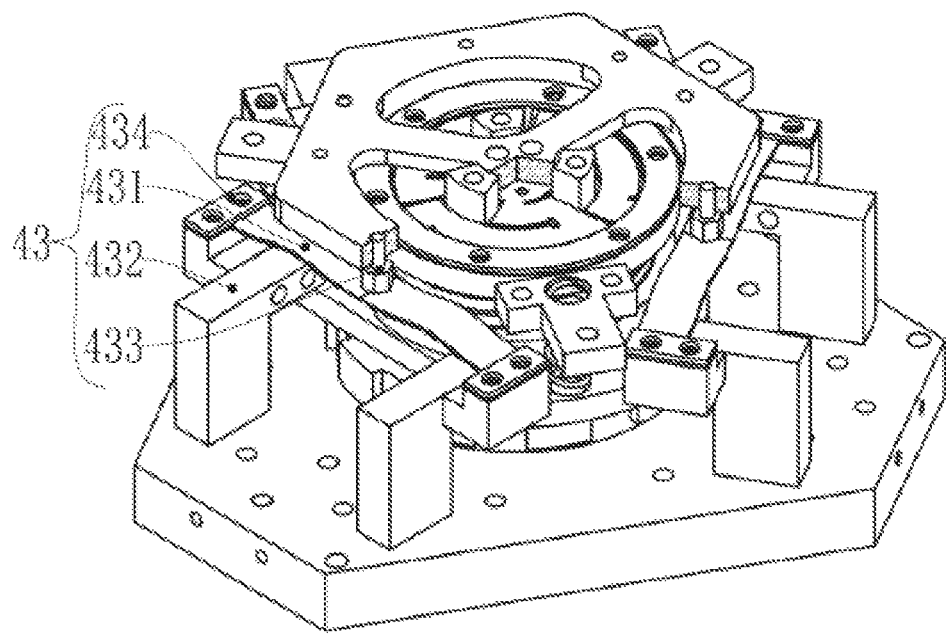
FIG. 7 is a schematic structural diagram of the negative stiffness component of the vibration isolation and leveling composite mechanism of the voice coil motor direct-drive active vibration isolation and leveling integrated platform according to one embodiment of the present invention.

To further explain, the vibration isolation and leveling composite mechanism 4 also includes a negative stiffness component 43, which includes buckling beams 431, buckling beam supports 432 and studs 433;

Multiple pairs of buckling beam supports 432 are symmetrically fastened to the base 2 around the center of the base 2; specifically, in one embodiment as shown in FIG. 7, three pairs of buckling beam supports 432 are symmetrically fastened to the base 2 around a 120° circumference around the center of the base 2.

The buckling beam 431 is an elongated rectangular metal sheet and installed in a buckled state on a pair of buckling beam supports 432. One end of the buckling beam 431 is fixed to one of the pair of buckling beam supports 432. The other end of the buckling beam 431 is fixed on the other pair of buckling beam supports 432; specifically, in an embodiment as shown in FIG. 7, the ends of the buckling beam 431 are fixed on the buckling beam supports 432 through buckling beam pressure plates 434. Specifically, the buckling beam pressure plates 434 are threadedly connected to the buckling beam supports 432 through bolts, so that the end of the buckling beam 431 is clamped between the buckling beam pressure plate 434 and the buckling beam support 432, thereby realizing the end of the buckling beam 431 fixed on the buckling beam support 432.

The stud 433 passes through the midpoint of the buckling beam 431 and is threadedly connected to the connection bracket 421. The spring force of the buckling beam 431 is transmitted to the central shaft 415. Specifically, the length of the buckling beam 431 is slightly longer than the distance between the pair of buckling beam supports 432. Therefore, when the buckling beam 431 is installed on the buckling beam supports 432 and pressed tightly, it will be in a buckling state. It can be known from the relevant theory of the buckling beam 431, when the buckling beam 431 is in a buckling state, applying pressure to the midpoint of the buckling beam 431 can cause the buckling beam 431 to enter a negative stiffness state. At this time, the spring force at the midpoint of the buckling beam 431 will exhibit negative stiffness characteristics. The connection bracket 421 transmits the negative stiffness spring force output by the buckling beam 431 to the central shaft 415. The negative stiffness spring force will offset the positive stiffness spring force exerted by the top elastic piece 412, the bottom elastic piece 413 and the coil spring 423, thus greatly reducing the dynamic stiffness of the moving platform 1. This can significantly improve the vibration isolation performance of the platform under the premise that the load support capacity of the moving platform 1 remains unchanged.

Specifically, the driving mechanism 3 includes several voice coil motors 31. The plurality of voice coil motors 31 are distributed in a central annular array of the moving platform 1. The stator of each of the voice coil motors 31 is connected to the base 2. The mover of the voice coil motor 31 is connected to the moving platform 1.

Specifically, in one embodiment of the present invention, the number of voice coil motors 31 is three, and the three voice coil motors 31 are distributed around the center of the moving platform 1 in the form of an equilateral triangle.

To further explain, the driving mechanism 3 also includes a limiting plate 32, which is erected on the base 2 and distributed on the outer periphery of the moving platform 1. There is a gap between the limiting plate 32 and the outer peripheries of the moving platform 1.

Figure 2:
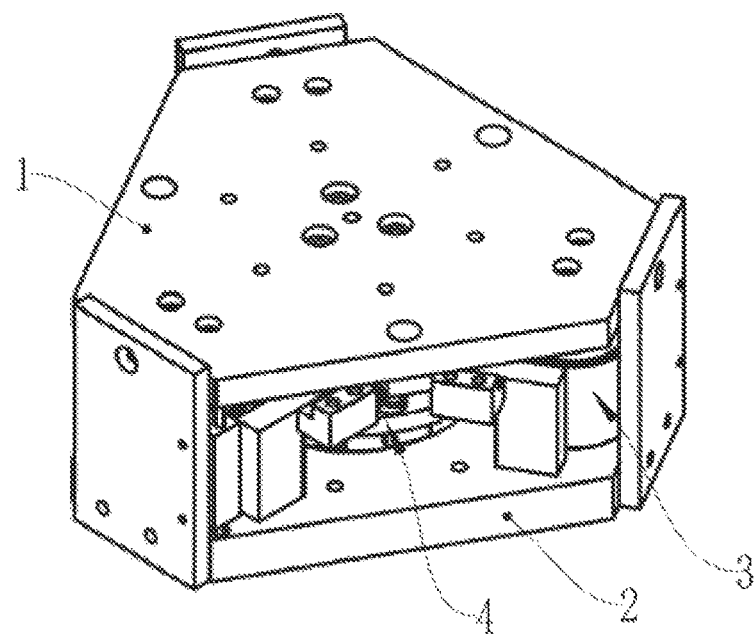
FIG. 2 is a schematic structural diagram of the voice coil motor direct-drive active vibration isolation and leveling integrated platform according to one embodiment of the present invention.
Figure 3:
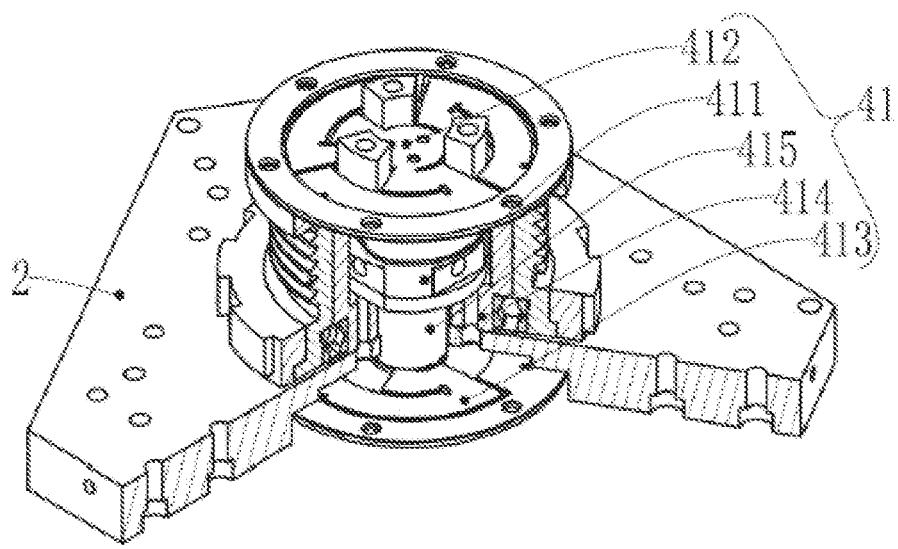
FIG. 3 is a schematic structural diagram of the motion constraint component of the vibration isolation and leveling composite mechanism of the voice coil motor direct-drive active vibration isolation and leveling integrated platform according to one embodiment of the present invention.
Figure 8:
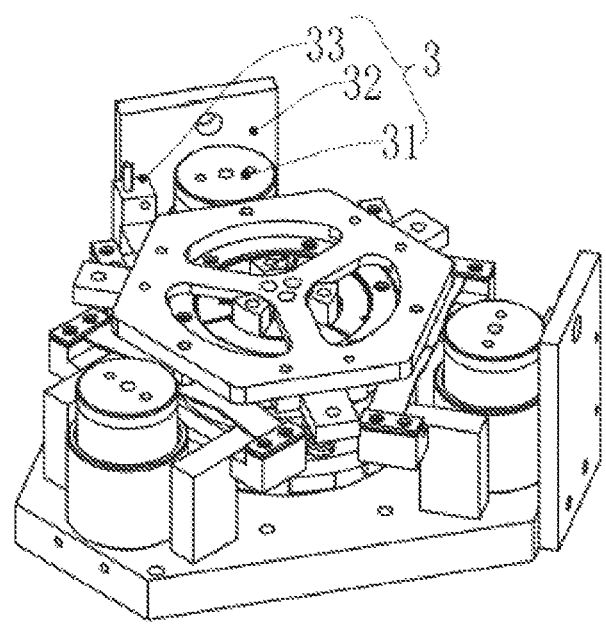
FIG. 8 is a schematic structural diagram of the voice coil motor direct-drive active vibration isolation and leveling integrated platform according to one embodiment of the present invention.

Specifically, as shown in FIGS. 2 and 8, the number of the limiting plates 32 is three, and the limiting plates 32 are arranged outside the voice coil motor 31 in one-to-one correspondence.

To further explain, the driving mechanism 3 also includes a displacement sensor 33, which is disposed inside the limiting plate 32 and used to detect the vertical displacement of the moving platform 1.

The three displacement sensors 33 respectively measure the vertical displacement of three non-collinear points on the moving platform 1, obtain the coordinates of the three points on the moving platform 1, and calculate the linear displacement of the moving platform 1 in the Z direction as well as the angular displacement in the X and Y directions according to geometric relationships. This provides feedback for the active vibration reduction controller and the dual-axis leveling controller of the moving platform 1 respectively.

Although the embodiments of the present invention have been shown and described, those of ordinary skill in the art will appreciate that various changes, modifications, substitutions and variations can be made to these embodiments without departing from the principles and purposes of the invention. The scope of the invention is defined by the claims and their equivalents.

What is claimed is:

1. A voice coil motor direct-drive active vibration isolation and leveling integrated platform, wherein, comprising a moving platform, a base, a driving mechanism and a vibration isolation and leveling composite mechanism;

the moving platform is rotatably arranged on the base around a X-axis and a Y-axis through the vibration isolation and leveling composite mechanism; the driving mechanism is used to drive the moving platform to perform leveling movements, so force exerted by the driving mechanism on the moving platform is circumferentially symmetrically distributed on the moving platform, and each force is perpendicular to the moving platform; the vibration isolation and leveling composite mechanism is used to isolate a vibration of the moving platform in a Z-axis direction, and to constrain the leveling movements of the moving platform around the X-axis and the Y-axis;

the vibration isolation and leveling composite mechanism comprises a motion constraint component, which comprises a flexible universal joint, a top elastic piece, a bottom elastic piece, a central housing and a central shaft;

the central housing is erected on a top surface of the base;

the top elastic piece covers the top opening of the central housing in a convex and concave deformation manner;

a top of the central shaft passes through the base and enters the interior of the central housing; the flexible universal joint is swingably-disposed on the top of the central shaft;

a top of the flexible universal joint passes through the top elastic piece and connects to the moving platform; a middle part of the top elastic piece is connected to a top surface of the central axis;

the bottom elastic piece is disposed on a bottom of the base so as to be deformable upwardly and downwardly; a middle part of the bottom elastic piece is connected to a bottom of the central shaft;

top and bottom surfaces of the central shaft are both provided with threaded holes for connection with the elastic pieces; a inner hole of the flexible universal joint is tightly matched with a middle layer of the central shaft and leans against a outer shoulder, and a top screw is screwed into a side threaded hole for fastening; a gap is defined between a inner layer of the central shaft and the flexible universal joint for the flexible universal joint to swing normally;

the vibration isolation and leveling composite mechanism further comprises a load unloading component, which comprises a connection bracket, spring stoppers, a coil spring and a support plate;

the support plate is sleeved on an outside of the central housing;

the connection bracket is covered on a top surface of the top elastic piece and is connected to the central axis;

spring stoppers are fixed on a bottom surface of the connection bracket, one end of the coil spring is sleeved in a limiting groove on a top surface of the support plate, and another end of the coil spring is sleeved in the spring stoppers.

2. The voice coil motor direct-drive active vibration isolation and leveling integrated platform according to claim 1, wherein, the load unloading component further comprises a screw runner and a hollow screw;

the hollow screw is disposed between the central housing and the support plate, and the hollow screw is rotatably sleeved on an outer periphery of the central housing; the support plate is sleeved on an outer periphery of the hollow screw, and threadedly connected to the hollow screw;

the screw runner is arranged below the support plate and tightly fitted on the outer periphery of the hollow screw.

3. The voice coil motor direct-drive active vibration isolation and leveling integrated platform according to claim 2, wherein, a bearing is provided between the hollow screw and the central housing, and a bearing gasket is provided between the bearing and the top surface of the base.

4. The voice coil motor direct-driven active vibration isolation and leveling integrated platform according to claim 1, wherein, the vibration isolation and leveling composite mechanism further comprises a negative stiffness component, which comprises buckling beams, buckling beam supports and studs;

multiple pairs of the buckling beam supports are symmetrically fastened to the base around the center circumference of the base;

the buckling beam is an elongated rectangular metal sheet; the buckling beam is installed in a buckling state on a pair of buckling beam supports; one end of the buckling beam is fixed on one of the pair of the buckling beam supports; other end of the buckling beam is fixed on other one of the pair of the buckling beam supports;

the stud passes through the midpoint of the buckling beam and is connected to the connection bracket.

5. The voice coil motor direct-drive active vibration isolation and leveling integrated platform according to claim 1, wherein, the driving mechanism comprises a plurality of voice coil motors, and the plurality of the voice coil motors are distributed in a central annular array of the moving platform; a stator of each voice coil motor is connected to the base, and mover of each voice coil motor is connected to the moving platform.

6. The voice coil motor direct-driven active vibration isolation and leveling integrated platform according to claim 5, wherein, the driving mechanism further comprises a limiting plate, which is erected on the base and distributed on an outer periphery of the moving platform; and a gap is provided between the limiting plate and the outer periphery of the moving platform.

7. The voice coil motor direct-driven active vibration isolation and leveling integrated platform according to claim 6, wherein, the driving mechanism further comprises a displacement sensor, which is arranged on an inner side of the limiting plate and used to detect vertical displacement of the moving platform.

* * * * *